US007782876B2

(12) United States Patent
Rogalski et al.

(10) Patent No.: US 7,782,876 B2
(45) Date of Patent: Aug. 24, 2010

(54) WIRELESS VOICE DATA GATEWAY

(75) Inventors: Gary Rogalski, Richmond (CA); Ralph Tischler, Surrey (CA); Douglas Alvarado, Surrey (CA); Kent Wah-shun Wong, Lei King Wan (HK)

(73) Assignee: VTech Telecommunications Limited, Tai Do, New Territory (HK)

( * ) Notice: Subject to any disclaimer, the term of this patent is extended or adjusted under 35 U.S.C. 154(b) by 1904 days.

(21) Appl. No.: 10/401,797

(22) Filed: Mar. 31, 2003

(65) Prior Publication Data

US 2004/0141484 A1     Jul. 22, 2004

Related U.S. Application Data

(60) Provisional application No. 60/438,530, filed on Jan. 8, 2003.

(51) Int. Cl.
*H04L 12/28* (2006.01)
*H04L 12/56* (2006.01)

(52) U.S. Cl. .................. 370/401; 370/353; 379/93.09

(58) Field of Classification Search .................. None
See application file for complete search history.

(56) References Cited

U.S. PATENT DOCUMENTS

| | | | | |
|---|---|---|---|---|
| 6,278,449 B1* | 8/2001 | Sugiarto et al. | ............ | 715/826 |
| 6,353,599 B1* | 3/2002 | Bi et al. | ............ | 370/328 |
| 6,577,642 B1* | 6/2003 | Fijolek et al. | ............ | 370/465 |
| 6,611,358 B1* | 8/2003 | Narayanaswamy | ............ | 358/442 |
| 6,738,981 B1* | 5/2004 | Tonnby et al. | ............ | 725/98 |
| 7,080,151 B1* | 7/2006 | Borella et al. | ............ | 709/230 |
| 7,110,763 B2* | 9/2006 | Suhail et al. | ............ | 455/435.1 |
| 7,213,076 B2* | 5/2007 | Bodin et al. | ............ | 709/232 |
| 7,349,412 B1* | 3/2008 | Jones et al. | ............ | 370/401 |
| 2002/0021696 A1* | 2/2002 | Minborg | ............ | 370/392 |
| 2003/0130864 A1* | 7/2003 | Ho et al. | ............ | 705/1 |
| 2003/0134650 A1* | 7/2003 | Sundar et al. | ............ | 455/465 |
| 2003/0139180 A1 | 7/2003 | McIntosh et al. | | |
| 2003/0179713 A1* | 9/2003 | Fleming | ............ | 370/252 |
| 2003/0235177 A1* | 12/2003 | Park | ............ | 370/338 |
| 2004/0037314 A1* | 2/2004 | Spear | ............ | 370/466 |
| 2004/0047310 A1* | 3/2004 | Chen et al. | ............ | 370/329 |
| 2005/0073979 A1* | 4/2005 | Barber et al. | ............ | 370/338 |
| 2005/0088999 A1* | 4/2005 | Waylett et al. | ............ | 370/338 |

FOREIGN PATENT DOCUMENTS

| | | |
|---|---|---|
| EP | 1 206 069 | 5/2002 |
| WO | WO 03/041348 | 5/2003 |
| WO | WO 03/063404 | 7/2003 |

OTHER PUBLICATIONS

GB Search Report dated May 17, 2004.

* cited by examiner

*Primary Examiner*—Raj Jain
(74) *Attorney, Agent, or Firm*—Paul, Hastings, Janofsky & Walker LLP

(57) ABSTRACT

A method for integrating cordless telephony, data network, and broadband connection is disclosed. Preferred embodiments of the invention are configured to provide one or more of the following tasks: (1) support voice over a WLAN with QoS with enhanced power consumption and range; (2) provide for both broadband telephony and PSTN access; (3) utilize a broadband connection to deliver content to a cordless handset; and (4) utilize a wired data terminal to provide enhanced telephony functions.

11 Claims, 9 Drawing Sheets

KNOWN ART

KNOWN ART

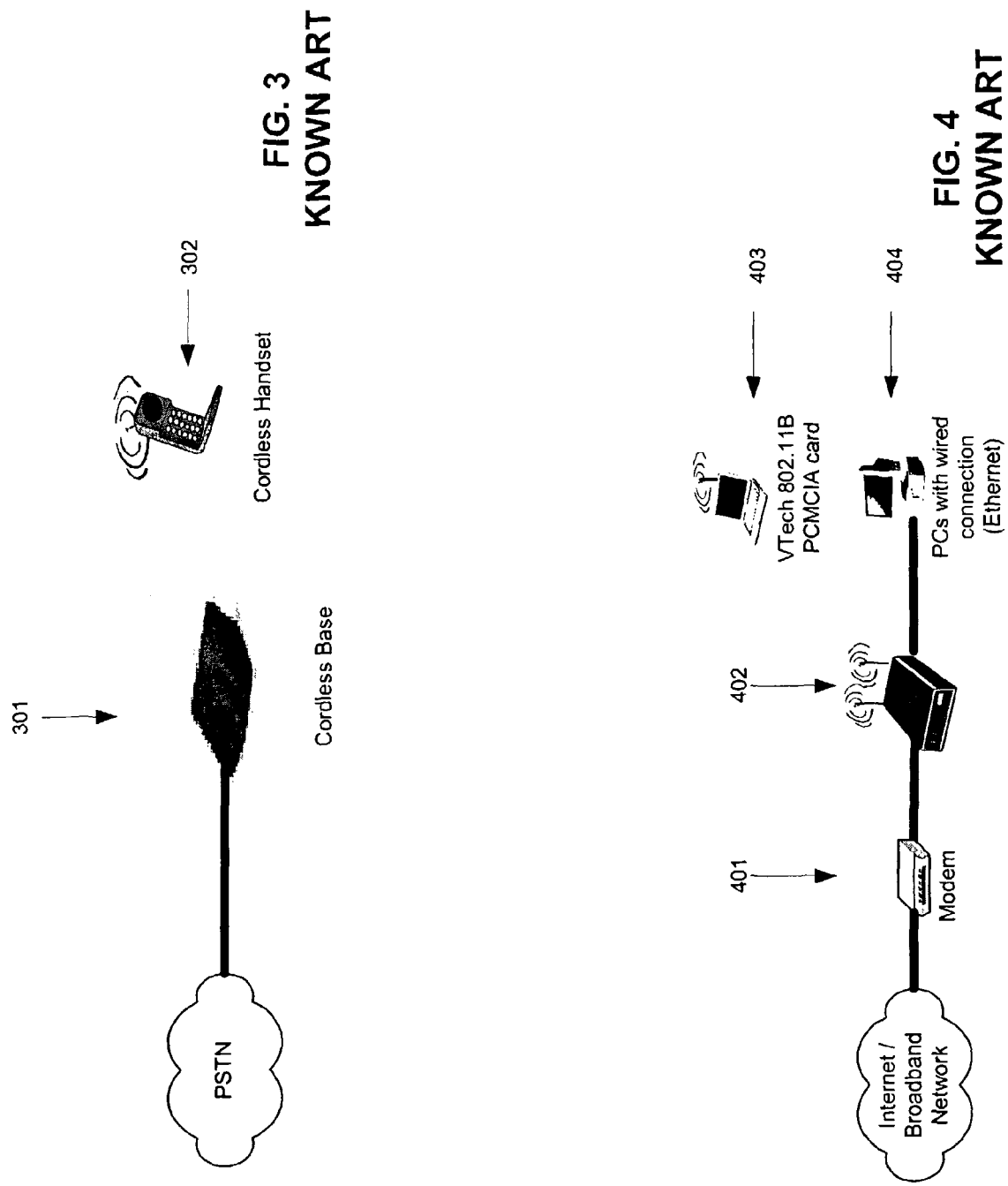

WIRELESS VOICE DATA GATEWAY

The application claims the benefit of U.S. Provisional Patent Application No. 60/438,530, filed Jan. 8, 2003, which is incorporated by reference in its entirety.

BACKGROUND

1. Field of the Invention

The present invention relates generally to a voice data gateway (VDG) and, more particularly, to a wireless VDG with telephony and data services functions intended for residential applications.

2. Background Of The Invention

Some business entities have wireless local area network (WLAN) based on the 802.11 technology (including 11b, 11a, and 11g) that utilizes the same air interface as 802.11b-based cordless telephones. The 802.11b-based cordless telephones, however, are typically intended for enterprise applications where the 802.11b handset communicates over an existing office LAN to an IP based softswitch to support VoIP communication either over dedicated data trunks to remote locations or to a PSTN connection via an IP-to-PSTN gateway.

Such 802.11b telephony system is costly, and it is not intended for residential applications. Furthermore, the existing 802.11b systems support voice/data with limited range and talk/standby time not suitable for residential applications.

Although some cellular or mobile telephone handsets (in non-802.11b applications) are equipped to handle data and are Internet enabled, these handsets deliver limited content over a relatively low-speed data link supported through the cellular network.

It is quite rare to find a residential unit that employs an integrated wireless voice/data system such as a home RF voice/data gateway. Many homes today are equipped with a cordless telephone, a wireless and/or wired data network, and a broadband connection to the outside world. The telephone, data network, and broadband connection, however, are not interoperable.

FIG. 1 shows a conventional system that uses external IP-to-PSTN gateway 100 to convert analog signals received from the PSTN network and sends packetized signals via Ethernet local area network (LAN) 101 and WLAN access point 102 to cordless handset 103. The transmission uses 802.11 standard data rates that are not optimized for power consumption. A typical application requires the user to configure IP-to-PSTN gateway 100 to communicate with WLAN access point 102 via a proprietary protocol. This protocol needs to synchronize the voice CODECs used by the 802.11-based handset 103 and IP-to-PSTN gateway 100. In addition, both IP-to-PSTN gateway 100 and WLAN access point 102 have to agree on a number of items, including, for example, how to communicate to handset 103 and PSTN network signaling commands (such as DTMF tones, VMWI tones, ring signals, CID message decoding, etc.). The typical system of FIG. 1 has the disadvantage of using an external IP-to-PSTN gateway, using a private network infrastructure for communicating with the WLAN access point, and utilizing a complicated set of rules and protocols for communicating signaling information to the WLAN access point. Furthermore, this convention system has limited cordless range and poor talk/standby time performance.

FIG. 2 shows a convention system that uses a central-office-located IP based softswitch 200. Softswitch 200 converts packetized voice signals that were originated at 802.11 cordless handset 203 and arrive at softswitch 200 via broadband network 201 and wireless access point 202. A typical application of this system requires the broadband service provider to set up the softswitch on their premises, set up a broadband network that support voice services, and specify the protocol to communicate signaling and voice information between the softswitch, the access point and the 802.11 handset. Furthermore, this system has limited cordless range and poor talk/standby time performance.

FIG. 3 shows a conventional cordless system that is used to provide access to the PSTN network from cordless handset 302 via cordless base 301. FIG. 4 shows a conventional 802.11 based data network, in which access point 402 provides broadband access to wireless terminal 403 and wired terminal 404 via external modem 401.

Each of the known systems described above has disadvantages and limitations. Accordingly, there is a need for a system that has the functionality to combine the flexibility to support both conventional PSTN telephony and broadband telephony. There is also a need for a system that provides the ability to deliver data content to a cordless handset without the need of external equipment. In addition, the system should preferably be able to support other enhanced telephony functions (such as voice recognition and voice synthesis) by utilizing the interconnection to wired data terminal (e.g., a personal computer) and the associated computer processing power.

SUMMARY OF THE INVENTION

The invention provides systems and methods that integrate cordless telephony, data network, and broadband connection. Preferred embodiments of the invention are configured to provide one or more of the following tasks: (1) support voice over a WLAN with QoS and enhanced power consumption and range; (2) provide for both broadband telephony and PSTN access through a wireless VDG; (3) utilize a broadband connection to deliver content to a cordless handset; and (4) utilize a wired data terminal connection to provide enhanced telephony functions. The preferred embodiment of the invention provides all four functions. Preferably, the method uses the 802.11 standard. For example, the 802.11b standard may be used. Other wireless standards may be used in alternative embodiments of the invention.

BRIEF DESCRIPTION OF THE DRAWINGS

FIG. 3 is a schematic diagram showing a typical implementation of voice only network . (Prior Art).

FIG. 4 is a schematic diagram showing a typical implementation of data only network. (Prior Art).

FIG. 4 is a schematic diagram showing a typical implementation of data only network.

DETAILED DESCRIPTION OF THE INVENTION

Figure 1:
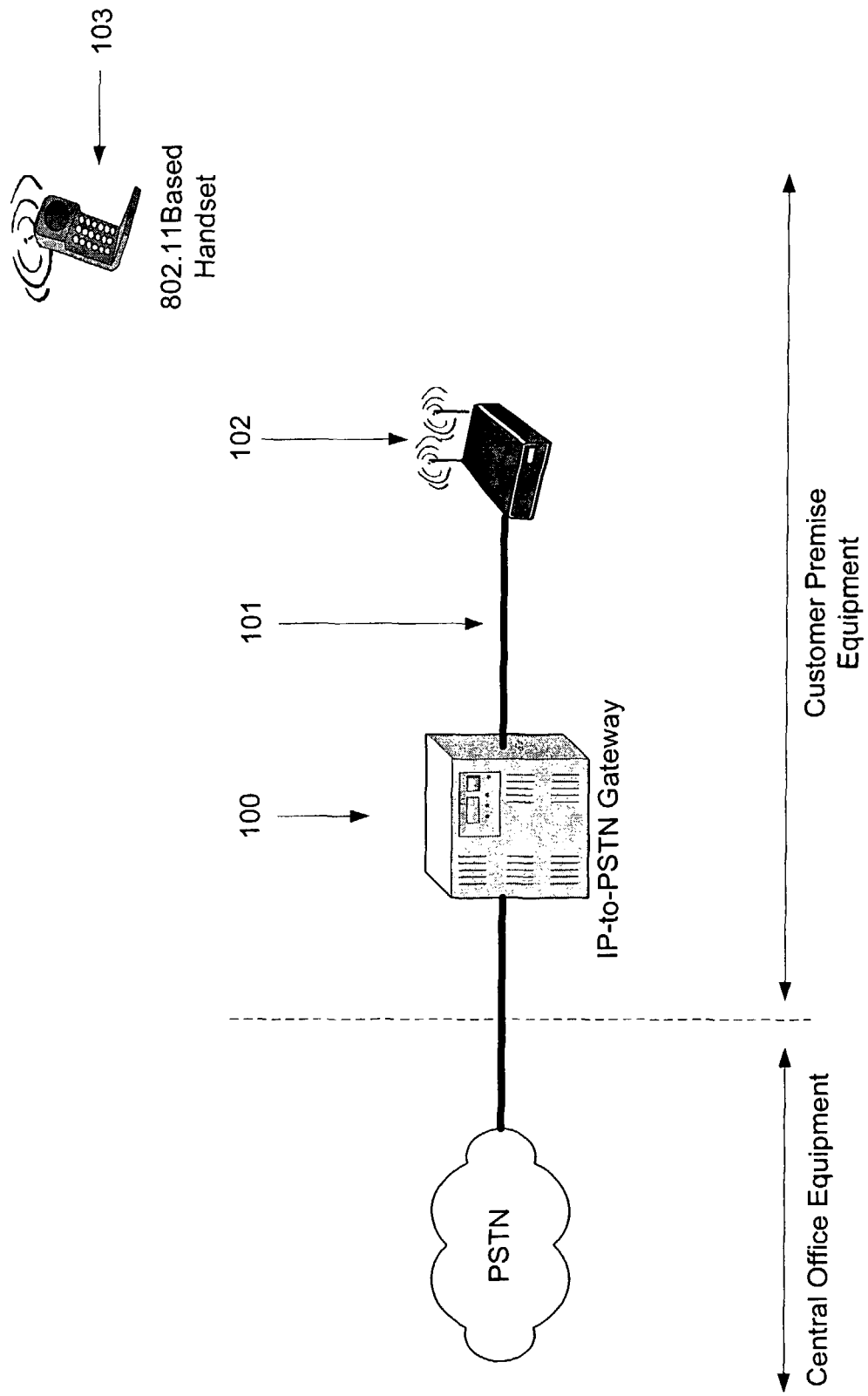
FIG. 1 is a schematic diagram showing a conventional system using an IP- to-PSTN gateway that is located in consumer premises. (Prior Art).
Figure 2:
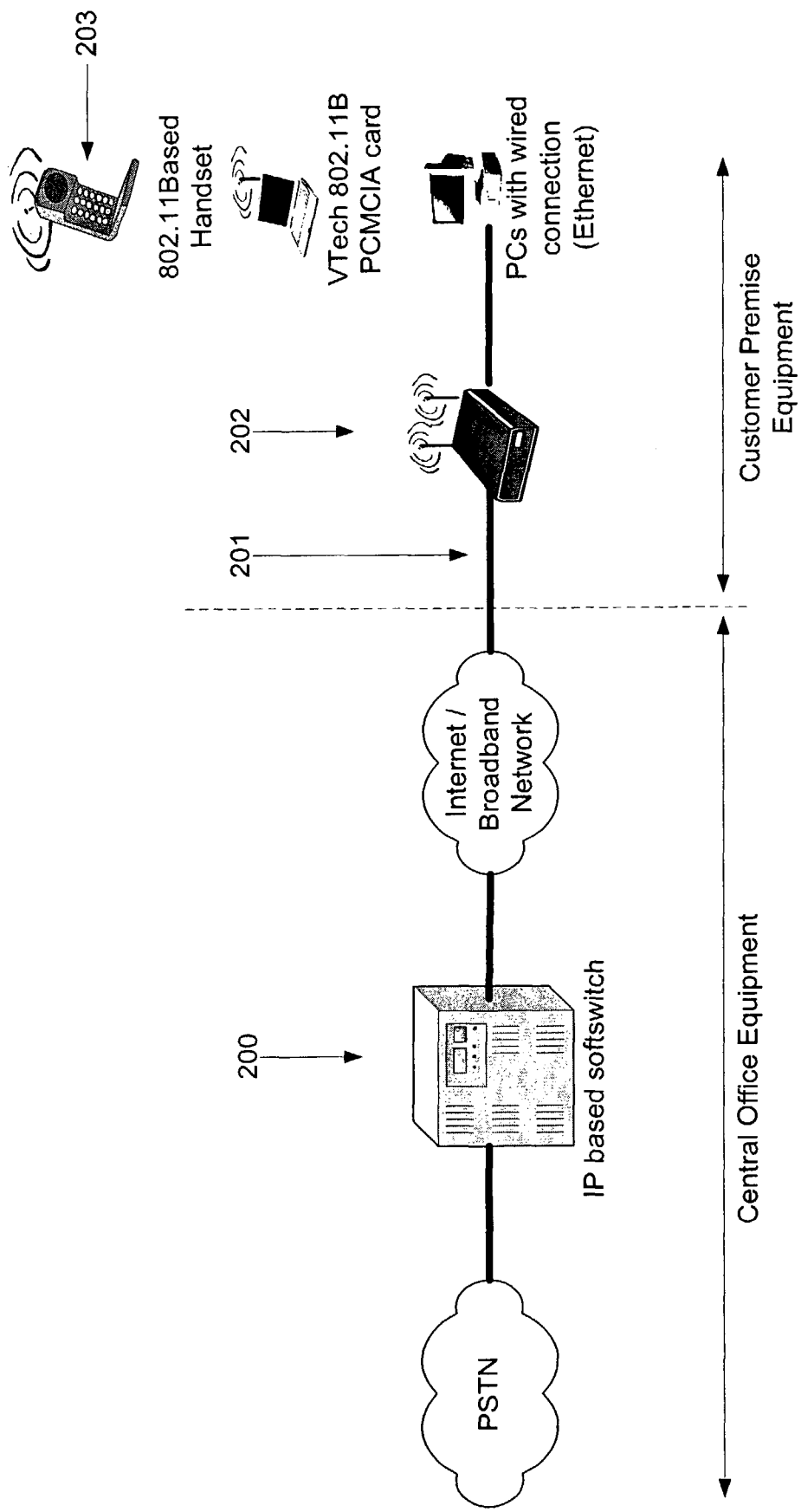
FIG. 2 is a schematic diagram showing another convention system using a "softswitch" that is located at a central office. (Prior Art).
Figure 5:
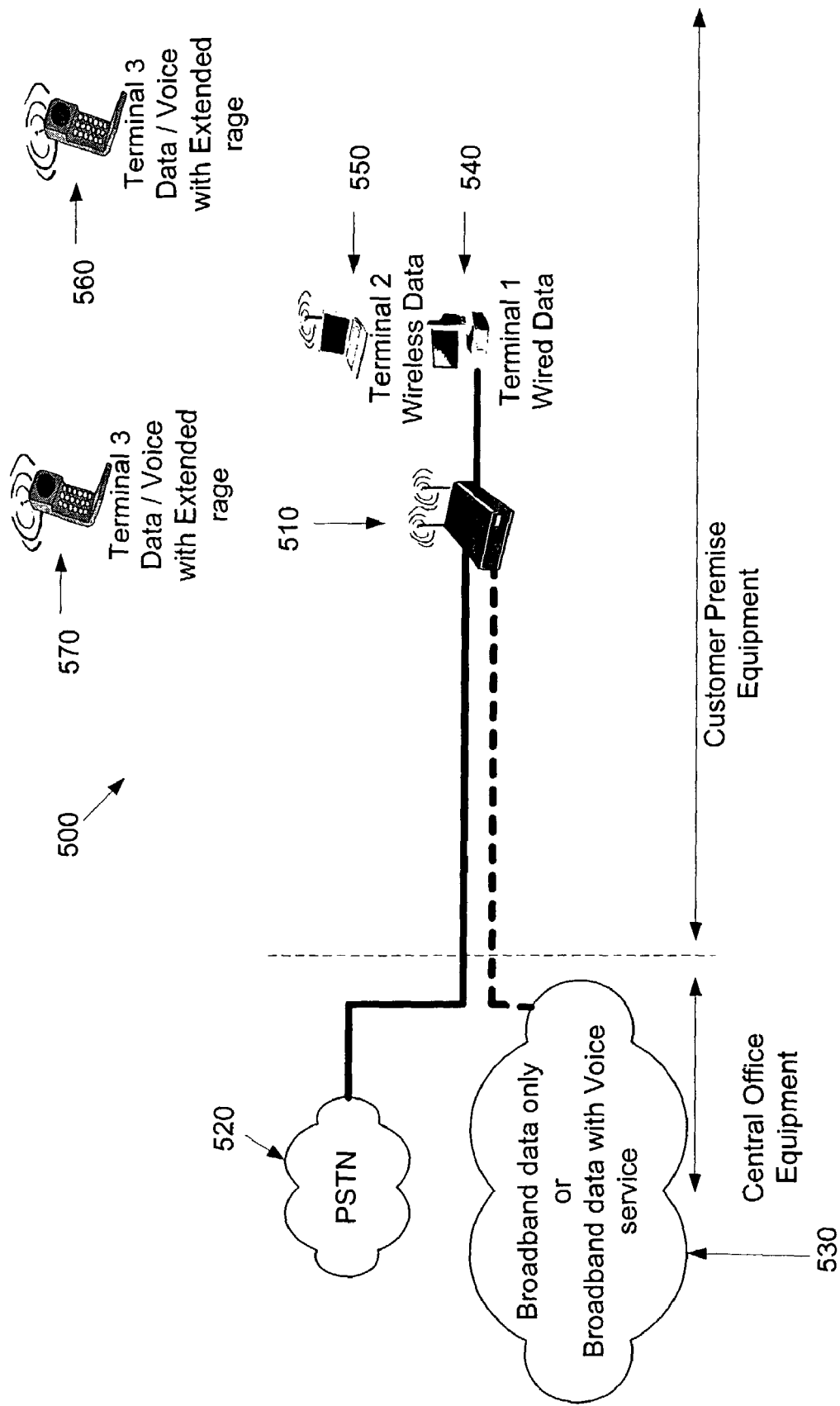
FIG. 5 is a schematic diagram showing a system of the invention.

FIG. 5 is a schematic diagram showing a system of the invention. In system 500, voice data gateway (VDG) 510 is connected to both PSTN network 520 and broadband network 530. VDG 510 is also connected to wired data terminal 540 (e.g., a personal computer), wireless data terminal 550 (e.g., a wireless laptop computer), and hybrid data/voice terminal 560 (e.g., a cordless handset). Additional terminals (e.g., cordless handset 570) can be configured to communicate with VDG 510.

An application of the invention requires a user to simply connect VDG 510 to networks 520 and 530 without further configuration to determine the services provided by the networks. VDG 510 automatically determines if a PSTN connection is available and determines if broadband network 530 supports data only or data with voice services.

In a first application of system 500, PSTN network 520 supports voice and broadband network 530 supports data. When a voice call is initialized by a first terminal (e.g., terminal 560), VDG 510 routes the voice information and signaling to PSTN network 520. If a second voice terminal is available (e.g., terminal 570), the second terminal shares access to PSTN network 520. When either of the first terminal or the second terminal requests data information, VDG 510 automatically makes the requested data via broadband network 530.

In a second application of system 500, PSTN network 520 supports voice and broadband network 530 supports both voice and data. When a voice call is initialized (e.g., by terminal 560), VDG 510 routes the voice information and signaling to PSTN network 520. If a second voice terminal is available (e.g., terminal 570), this terminal has the option to either share access to PSTN network 520 with terminal 560 or utilize the broadband voice services as a virtual PSTN network. This is made possible due to VDG 510's broadband-to-PSTN function. When either the first terminal or the second terminal requests data information, VDG 510 automatically makes the requested data via broadband network 530.

One advantage of system 500 is that it utilizes existing networks for voice and data services (e.g., networks 520 and 530) without the need for additional equipment investment on either the customer premises or the service provider's central office. In addition, the invention provides the flexibility that once voice services are available over broadband network 530, the additional services can be provided to the user without any changes to the configuration paradigm or additional investment in equipment.

Furthermore, the voice services are provided via a novel implementation of handset 560, targeted specifically at residential applications, which have higher expectations for range and power consumption (talk/standby time). Finally, the invention allows for additional services to be provided when there is a wired data terminal (e.g., terminal 540) connected to VDG 510. For example, a voice recognition program can be run on terminal 540. When voice commands are entered on handset 560, the voice is digitized, packetized, and sent to VDG 510. VDG 510 then routes the digitized voice to terminal 540, which then parses its voice command library and feedback the appropriate command to VDG 510 for execution.

Accordingly, one preferred embodiment of the invention is a fully integrated voice data gateway (e.g., VDG 510). The gateway of the invention utilizes a single air interface for cordless telephony and data networking. The gateway can be configured to allow for flexibility for both conventional PSTN telephony and broadband based telephony. Broadband-based telephony can include, for example, VoIP, VoDSL, VoCable. The gateway makes it possible to provide enhanced services through a broadband data interconnection and a connection to a computer (e.g., terminal 540). Preferably, the gateway uses the 802.11b standard. Other standards may be used. For example, the 802.11a as well as other WLAN standards may be utilized to implement other embodiments of the invention.

One of the advantages of a system of the invention is that the system makes it possible to utilize the regular PSTN telephony and a broadband connection (therefore viable for the residential market) to provide voice and data functionality associated with a WLAN. The system of the invention further enhances the functionality by providing a wide data pipe to deliver better content to a handset of a cordless telephone (e.g., terminal 560). Moreover, the system can be configured to provide other enhanced functions through the processing power of a home-based personal computer.

Another advantage of the invention is that one integrated system (e.g., system 500) can support both PSTN and broadband telephony as well as wireless data networking. In the conventional arrangement, the use of separate devices and separate technologies can suffer from performance problems due to the interoperability issues between a WLAN system and a cordless telephony system since both of these systems operate in the same band (i.e., the 2.4 GHz band).

An exemplary gateway of the invention uses the 802.11b standard. However, the invention is not limited to the 802.11b standard, any wireless standard may be utilized. The exemplary gateway of the invention is configured to do one or more of the following four functions:

1. Support a wireless protocol for quality of service (QoS) along with a method for optimizing range and power consumption.
2. Provide for both broadband telephony and PSTN access through the gateway;
3. Utilize the broadband connection for providing content to the cordless handset; and
4. Utilize the PC connection to provide enhanced telephony functions.

Support Voice Over WLAN with QoS

Supporting voice on an 802.11b system requires a mechanism to ensure QoS (quality of service). Regular data packets in a network that does not supporting real time voice, e.g., a data only network, wireless link quality is not severely impacted by latency introduced by additional loading of the data network. Once real time access is required to support voice communication, detrimental latency will be encountered. This latency must be controlled so that the introduction of hybrid voice/data terminal does not impact the data network and is transparent to the end-user. There are a number of proposed mechanisms for ensuring QoS. For example the 802.11e draft standard calls for a Hybrid Coordination Function (HCF) to provide the QoS. However, this is not enough, since introduction of a QoS mechanism does not address the residential voice data gateway requirements for range and talk/standby time comparable to existing cordless telephones.

Achieving the required talk and standby times typically expected for a cordless device (e.g., about 8 hours and about 7 days, respectively) is a function of current draw in the various modes of operation and battery capacity. Range requirements are typically about 1,200 feet in an open field environment.

Talk time is in large part determined by transmitted power. Accordingly, the current consumption can be reduced if the transmit power is reduced. Reducing the transmit power, however, has the side-effect of reducing range. As a result, the reduction in transmit power needs to be offset by a corresponding increase in the radio receiver sensitivity. The radio receiver sensitivity is in large part determined by the data rate and corresponding bandwidth required to support that data rate.

The invention provides a solution that operates at a data rate at or lower than the lowest data rate of 1 Mbps defined for 802.11b. For example, a data rate between about 250 kbps and about 750 kbps may be used. A data rate in this range provides reasonable RF sensitivity while maintaining a relatively high-speed data link to support the enhanced functionalities of the invention that are described herein. The data rate and protocol of the invention can be used when there are no other standard 802.11b data devices on the network. One embodiment of the invention uses FSK modulation with a data rate of between about 250 Kbps and about 700 Kbps to get reasonable RF sensitivity. Similarly, the data rate and protocol of the invention can be used along with other medium reservation mechanisms available in 802.11b such as RTS/CTS (Request To Send/Clear To Send).

Furthermore, the gateway of the invention is configured to switch to a standard 802.11b compliant data rate and protocol when there is no requirement for voice applications, e.g., when the network is being used by data only devices. If the gain in receiver sensitivity is greater than the reduction of the transmit power, then the system range is also improved. The improvement in the standby time is realized through the implementation of the short message header defined in the 802.11b standard and implemented in 802.11g and draft version of 802.11 e. The invention can also be configured to adopt a non-standard data rate.

Provide for Both Broadband Telephony and PSTN Access Through the Gateway

In residential applications today the vast majority of users utilize PSTN connection and conventional circuit switched telephony. Packet or broadband based telephony, VoIP as it is sometimes called, requires the user to have hardware that supports some call set-up protocol (such as SIP, H.323, MGCP, etc.) and then either connect over a data trunk, possibly the Internet, to a far end device supporting the same protocol. This is impractical in most cases, as the installed base of these types of devices is simply not large enough.

Another option is to use a third party broadband-to-PSTN gateway to connect the far end back into the circuit switched telephony system. This overcomes some of the problems with end-to-end broadband telephony but requires the use of a third party which typically charges for the service thereby negating one of the benefits (e.g., lower cost) of broadband telephony.

It is anticipated that telephone companies would eventually provide for broadband based connections to the end user, and the broadband telephony would operate in the same way as conventional circuit switched telephony from an end-user point of view. The broadband based systems, however, would have the capability to provide many of the enhanced services not available in the conventional telephony.

The invention provides a solution to provide the voice/data gateway with the ability to support both circuit switched telephony through the PSTN connection and broadband based telephony. This requires not only supporting one or more of the call set-up protocols mentioned previously but also the ability to perform the broadband-to-PSTN gateway translation function. A system of the invention is preferably configured to default to the PSTN.

The exemplary gateway of the invention (e.g., VDG 510) has a connection to the PSTN network via a line interface. The exemplary gateway monitors the line voltage and signaling on the line interface to determine its availability. In the event that the user initializes an outgoing call, the gateway goes off-hook and transmits the correct network signaling for call initialization, e.g., via the ten digit DTMF tones used for call setup. Once the call is initialized, the analog signaling to and from the POTS line interface can be digitized by CODECs, packetized by the main communications processor, and transmitted to the cordless handset.

The exemplary gateway would also have a connection to a broadband network via a broadband interface, such as a xDSL modem, cable modem, etc. The exemplary gateway determines if the broadband network provides voice services such as VoDSL, VoPacket Cable, etc., and determines the necessary protocols to be used for simulating a PSTN network over the broadband network. The broadband-to-PSTN gateway function allows a user to utilize a broadband connection with voice services in the same way as a standard PSTN interface, making the underlying technology transparent to the end user. Thus, if two users wanted to make calls simultaneously, one user could have access to the PSTN network via the PSTN line interface, while the other user would have access to the voice services of the broadband network via the broadband-to-PSTN gateway translation function.

Utilize the Broadband Connection for Providing Content

The broadband connection allows for faster access to content, for example, from the Internet. The high-speed air interface allows for faster transfer of data between a gateway of the invention and the remote device.

In the present invention, both operating conjunctions (a cordless handset connected to a voice network via broadband network or the PSTN network) allows content (e.g., stocks, weather, etc.) to be easily downloaded and displayed on the cordless handset. As many websites are set up using HTML or some other type of mark-up language with graphical content, the gateway of the invention is configured to determine what protocol or mark-up language the website is using, then apply an application layer translation algorithm to reconstitute the information to present the content to the handset in a form consistent with the display capability of the handset. In its simplest form, this involves stripping off the encapsulated text headers and sending only the text header information to the handset. In the simplest form, access to the content provides limited browsing capability from the cordless handset.

The exemplary gateway of the invention is configured to have the capability of acting as an interpreter or customized page server between the cordless handset and the external broadband network. In addition, the exemplary gateway customizes handset's text I/O to match the handset's display capabilities. For example, if a cordless handset would like to have access to the webpage "http:\\www.vtech.com\index.htm", the user would enter "vtech.com" in the handset via the keypad interface or other text entering mechanism such as voice recognition, etc. The handset would then send a request to the gateway, which contains web browsing software, that will enable it to establish an HTTP connection to the vtech.com server and then request page index.htm via well known commands of the HTTP protocol. Once the index.htm page is retrieved from the vtech.com server, it would then be parsed and its text based information customized for display in the cordless handset.

Figure 6:
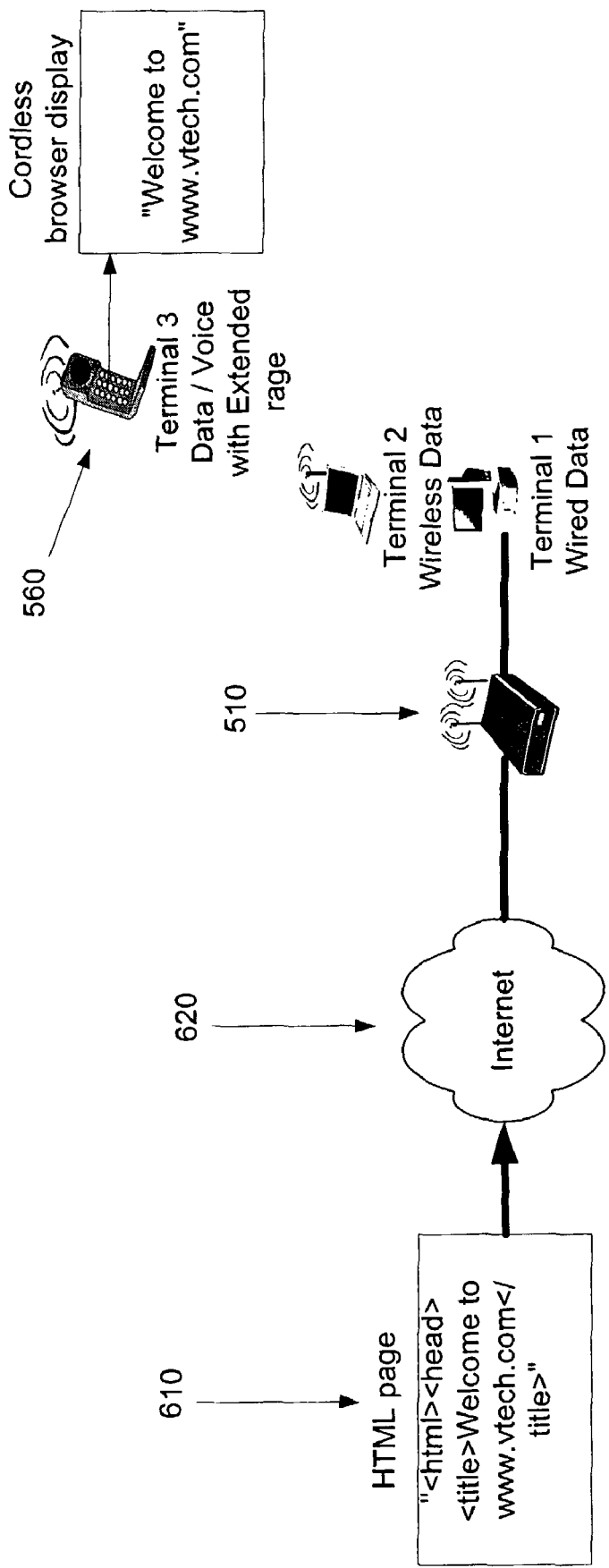
FIG. 6 is a schematic diagram showing an embodiment of the invention that can be used to provide content to a cordless handset.

FIG. 6 shows a preferred configuration of VDG 510 being used to provide content to handset 560 by acting as a customized page server between cordless handset 560 and HTML server 610 over Internet 620. In this embodiment, a user of handset 560 requests to download an HTML page located on server 610 via Internet 620. VDG 510 then proceeds to request the content from server 610. This action may include establishing an HTTP connection, using the HTTP protocol to download an HTML coded page and parsing the HTML coded page and format the parsed content for display in handset 560.

Figure 7:
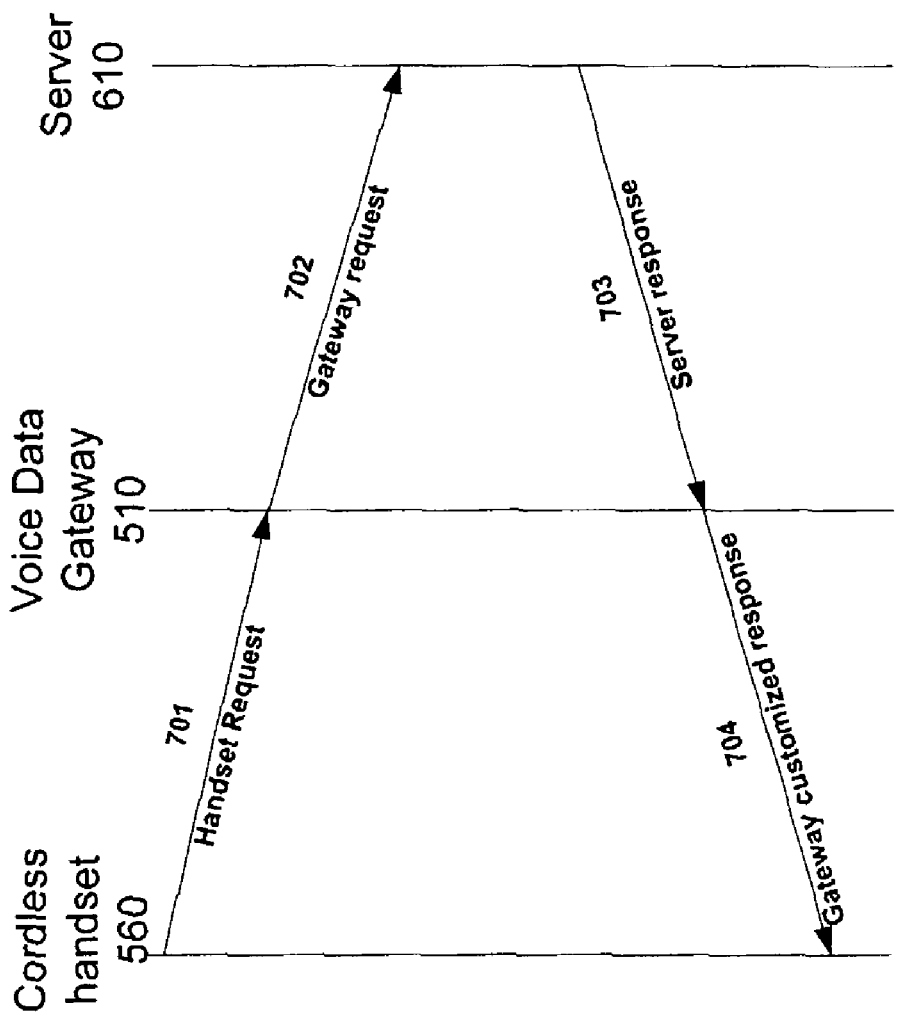
FIG. 7 is a schematic diagram showing a process involved in providing broadband content to a cordless handset.

FIG. 7 is a schematic diagram showing a process involved in providing broadband content to handset 560 shown in FIG. 6.

In step 701, handset 560 makes a request to VDG 510 for content that may be located on Internet 620. For example, handset 560 sends a command to retrieve the content from server 610. For discussion purposes, assume server 610 is associated with the URL www.vtech.com.

In step 702, VDG 510 after receiving the command from handset 560 to retrieve the content from the website, VDG 510 interprets this command as follows: (1) establish a HTTP connection to server 610, which is located at www.vtech.com; and (2) utilize HTTP protocol to retrieve HTML file "index.htm" located at server 610.

In step 703, VDG 510 receives an HTML coded file from server 610 and with knowledge of the display capabilities on handset 560, proceeds to format the content in a way that is suitable for display in handset 560.

In step 704, VDG 510 sends the correctly formatted content to handset 560 as requested.

Utilize PC Connection to Provide Enhanced Telephony Functions

With the interconnection between the gateway and the PC (i.e., wired data terminal 540), the processing power of the PC can be leveraged to enhance the functions of the cordless telephony system in a way that would otherwise be impractical or cost prohibitive. Voice recognition and voice synthesis are two of the functions that can operate effectively from a PC platform.

The invention is configured to run the voice recognition and voice synthesis algorithms on the PC. As a result, the need to provide this processing capability within the gateway is removed.

In the case of voice recognition, voice from the cordless handset is wirelessly communicated to the gateway. The gateway then routes the voice data to the PC where it is decoded back into its analog form and processed. Then, the corresponding result is communicated back to the gateway where the telephony MMI (Man Machine Interface) acts in accordance with the result.

In the case of voice synthesis, a command is sent to the PC. The PC synthesizes the appropriate text string, encodes it using the appropriate voice CODEC and communicates this back to the gateway and the handset.

Many other telephony functions such as full duplex speakerphone, digital answering machines, pictures CID (Customer Identity), etc. can be realized in the same way. A high speed 10/100BT link between the PC and the gateway makes these functions "appear" to operate in real time to the end user.

Figure 8:
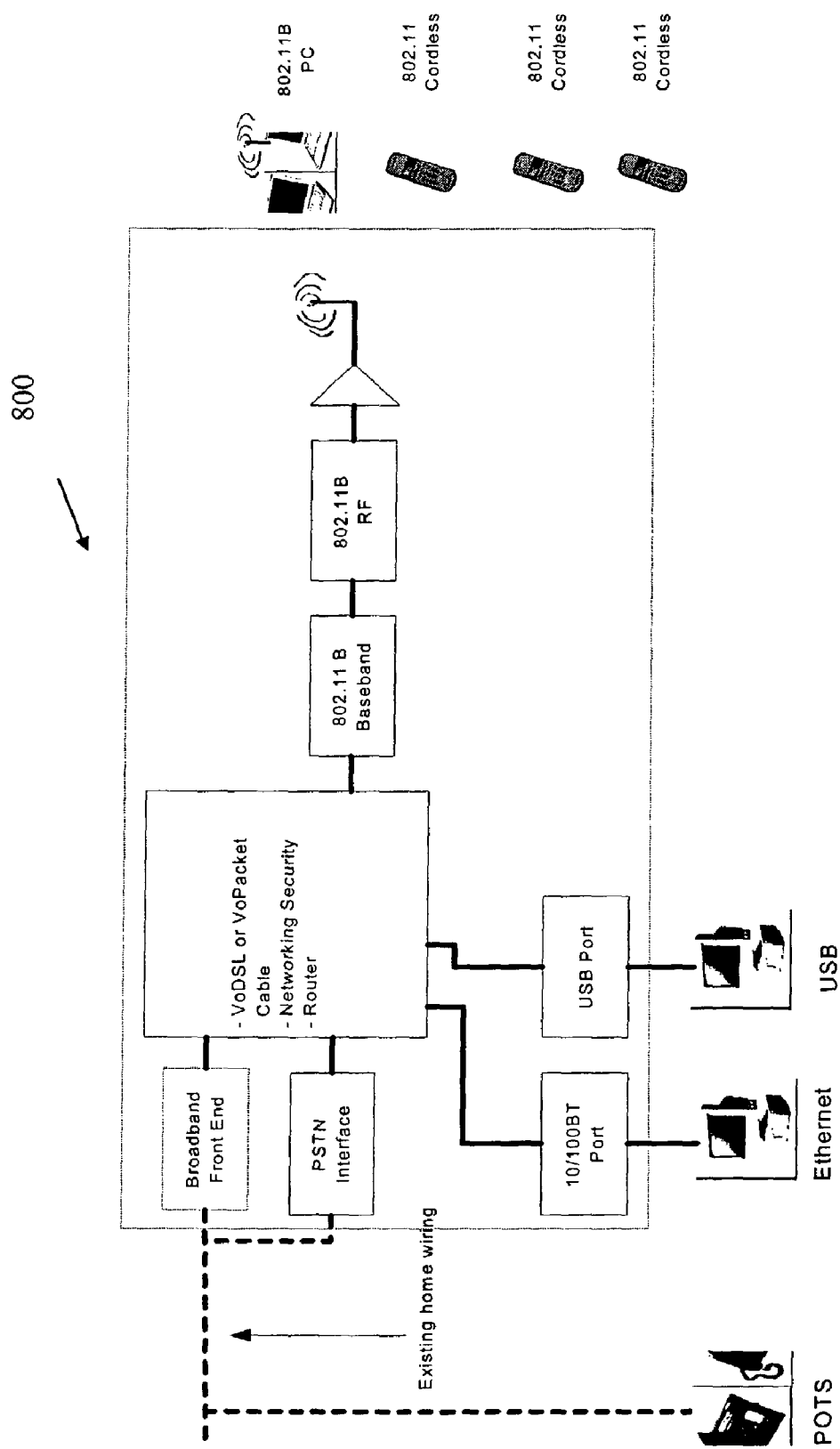
FIG. 8 is a schematic diagram showing an exemplary layout of a system according to one embodiment of the invention.
Figure 9:
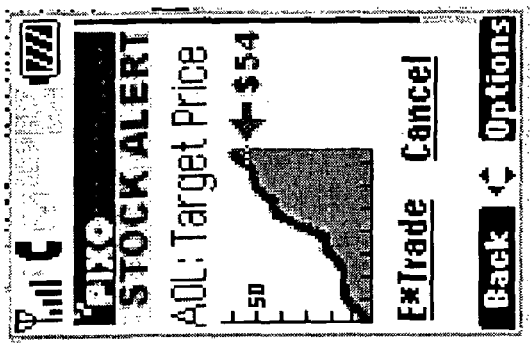
FIGS. 9, 10, 11, and 12 are exemplary screenshots that can appear on a handset in accordance with an embodiment of the invention.
Figure 10:
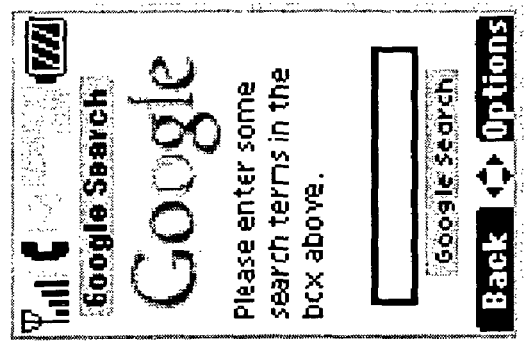
Figure 11:
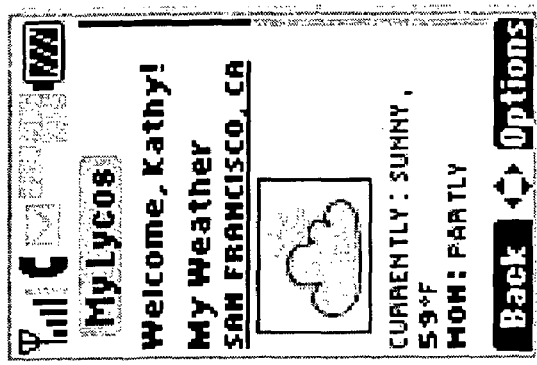
Figure 12:

FIG. 8 is a schematic diagram showing an exemplary layout of a system according to one embodiment of the invention. System 800 is an exemplary embodiment of the invention. System 800 is configured to:

Be fully complaint with IEEE 802.11b specification;
Have an integrated broadband front end (e.g., a DSL modem);
Support advanced firewall functionality (e.g., NAT, NAPT, Packet Filtering, DOS attack defense, packet inspection, and VPN);
Provide parental controls;
Use single Ethernet/DMZ port;
Have DHCP (Dynamic Host Configuration Protocol) and Telnet support; and
Support 64-bit and 128-bit WEP (Wired Equivalency Privacy) encryption.

In one specific implementation, system 800 can include the following specifications:

DSL Modem: U-R2/G.992.1;
Ports: one RJ-45 (DSL), one RJ-45 (10/100 Base-T Ethernet), and one USB (optional);
RF Sensitivity: less than −90 dBm; RF Operating Channels: 13 for Europe and 11 for North America; RF Data Rates: 11 Mbps, 5.5 Mbps, 2 Mbps, 1 Mbps, custom (250-750 kbps); and RF Output Power: +20 dBm, 100 mW at 2.4 GHz.

System 800 preferably uses 802.11b standard. System 800 is configured to provide one or more of the following capabilities: (1) support voice over the 802.11b link and achieve an acceptable talk/standby time and range for a cordless system using the 802.11b air interface; (2) provide for both broadband telephony and PSTN access through the gateway; (3) utilize the broadband connection for providing content to the cordless handset; and (4) utilize the PC connection to provide enhanced telephony functions. Preferably, system 800 is configured to provide all four capabilities.

The requirements for voice over the 802.11b interface include:

QOS provision must be provided;
Protocol must support power saving; and
Data rate limited to 1 Mbps or lower to get maximum RF sensitivity and required range.

The power saving requirements for system 800 is implemented more efficiently in 802.11e with provisions for short message headers allowing for shorter wake-up's and greater standby time for cordless applications.

The enhanced functionality options of system 800 can include:

Supports either VoIP via broadband or analog voice via PSTN interface;
PC connectivity allows for voice recognition, TAD functions, picture download (visual CID), advanced address book options, etc.; PDA Functionality (calendar, memo, etc.);
Email access;
Download content from the Internet to handset (WML, CHTML); and
Pre-formatting of HTML pages in the gateway.

Each of FIGS. 9, 10, 11, 12 shows an examplary screenshot of a screen of a handset in accordance with an embodiment of the invention. Preferably, the screen is condifured to display colors.

Figure 14:
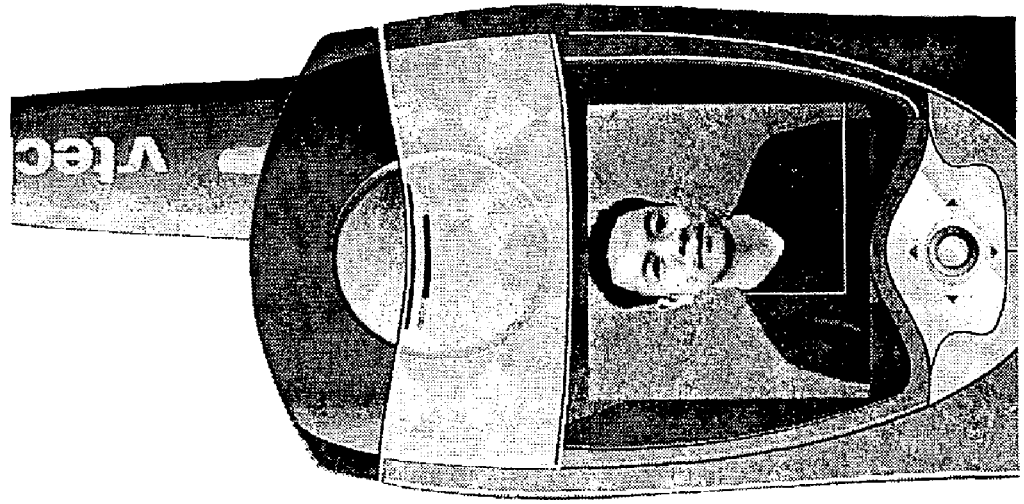
FIGS. 13 and 14 are exemplary screenshots that can appear as a picture customer identity (CID) on a handset in accordance with an embodiment of the invention.
Figure 13:
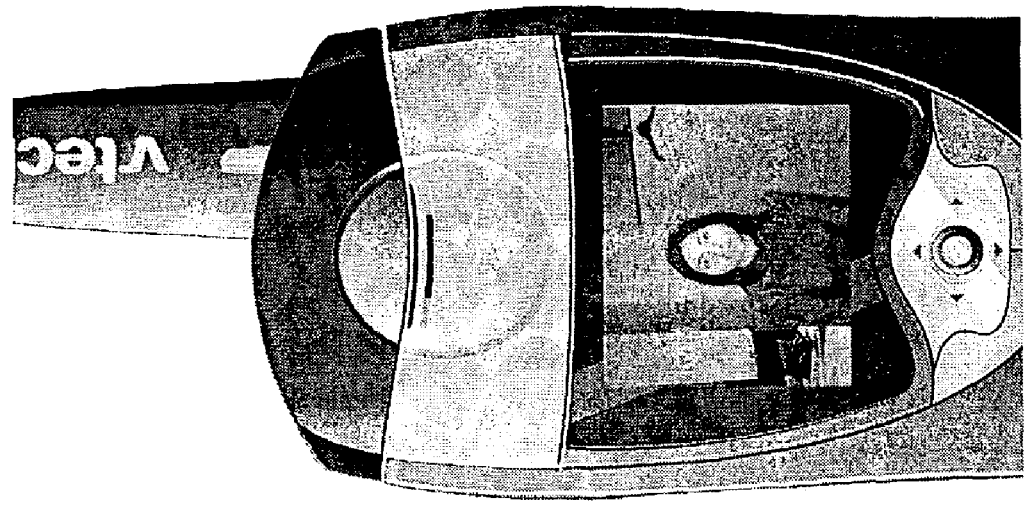

FIGS. 13 and 14 are examplary screenshots that can appear as a picture customer identity (CID) on a handset in accordance with an embodiment of the invention.

Preferably, a large number of images can be stored on the PC with no handset up-charge for image storage. If images were stored on the handset for picture CID, then there would be a cost adder in the handset for this storage capacity. Removing this from the handset and utilizing the PC hard disk for storage allows for the storage of a very large number of images with no cost adder at all.

In a typical application, a digital multi-handset cordless system operating at 2.4 GHz and the 802.11b WLAN interfere with one another. A single 802.11b channel takes out slightly more channels than one can swap out with a typical 75 channel FHSS (Frequency Hopping Spread Spectrum) system.

In a typical FHSS application, short bursts of packets are transmitted over a range of 75 or more channels (out of a maximum of 100 channels). The FHSS has the ability to replace or "swap out" about 25 channels if they are deemed to suffer from interference. In this way, a block of spectrum that is as wide as 25 channels can be replaced. A single 802.11b carrier is so wide that it wipes out a block of spectrum wider than the 25 channels. It is therefore impossible through only channel substitution to avoid 802.11b in a 75 channel frequency hopping system.

Accordingly, it is preferably that ten meters of minimum separation should be maintained between devices to ensure negligible impact on the WLAN.

To overcome interoperability issues, the invention is preferably configured to coordinate between 802.11b and the digital multi-handset cordless system. Moreover, the invention may also be configured to operate a true 5.8 GHz system instead of 2.4 GHz.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
utilizing a wired data terminal directly connected using a local hardwire connection to a voice data gateway to provide one or more enhanced telephony functions to a cordless handset via the voice data gateway, wherein the cordless handset is part of a WLAN that includes the voice data gateway, wherein at least a portion of the one or more enhanced telephony functions is performed at the wired data terminal,
wherein providing the one or more enhanced telephony functions comprises providing a voice recognition function by:
wirelessly communicating a digitized voice command from the cordless handset to the voice data gateway,
sending the digitized voice command over the local hardwire connection to the wired data terminal, and
receiving, at the voice data gateway, a processed voice command for execution, the processed voice command based upon processing of the digitized voice command at the wired data terminal and transmitted over the local hardwire connection;
receiving at the voice data gateway a request from the cordless handset to retrieve content from a server;
establishing a connection to the server;
retrieving the content from the server at the voice data gateway;
determining display capabilities of the cordless handset;
formatting the content at the voice data gateway in accordance with the display capabilities; and
sending the formatted content to the cordless handset,
wherein the retrieving the content comprises:
establishing an HTTP connection between the voice data gateway and the server; and
using an HTTP protocol to download an HTML coded page;
wherein the formatting the content comprises:
parsing content from the HTML coded page; and
formatting the parsed content for display in the cordless handset,
wherein sending the formatted content to the cordless handset comprises wirelessly communicating the parsed content from the voice data gateway to the cordless handset.

2. The method of claim 1, wherein the cordless handset is part of a network of terminal devices wirelessly coupled to the voice data gateway, the method further comprising:
performing broadband-to-PSTN gateway translation functions to provide for both broadband telephony and PSTN access for the network of terminal devices, wherein the voice data gateway is configured to operate at a data rate less than 1 Mbps when no standard 802.11 data devices are on the network, and wherein the voice data gateway is configured to switch to a data rate at least 1 Mbps when the network is being used by data only terminal devices.

3. The method of claim 2, wherein the voice data gateway is configured to default to a PSTN connection unless otherwise configured by a user.

4. The method of claim 1, further comprising stripping off encapsulated text headers of the content and sending only the text headers to the cordless handset.

5. A system comprising:
a cordless handset configured to process voice and data; a voice data gateway in wireless communication with the cordless handset in a WLAN;
a wired data terminal directly connected using a local hardwire connection to the voice data gateway, wherein the system is configured for: supporting a voice communication of the cordless handset to achieve an acceptable talk time, an acceptable standby time, and an acceptable range;

providing for both broadband telephony and PSTN access by the cordless handset; utilizing a broadband connection to deliver content to the cordless handset; and utilizing the wired data terminal to provide enhanced telephony functions to the cordless handset via the voice data gateway, wherein providing the enhanced telephony functions comprises providing one or more of a voice recognition function and a voice synthesis function, each of the voice recognition and voice synthesis functions configured for: forwarding commands from the voice data gateway over the local hardwire connection to the wired data terminal, and receiving, at the voice data gateway, a processed voice command for execution, the processed voice command based upon processing of a digitized voice command at the wired data terminal and transmitted over the local hardwire connection, wherein the utilizing the broadband connection to deliver content comprises: receiving at the voice data gateway a request from the cordless handset to retrieve content from a server; establishing a connection to the server; retrieving the content from the server at the voice data gateway; determining display capabilities of the cordless handset; formatting the content at the voice data gateway in accordance with the display capabilities; sending the formatted content to the cordless handset, wherein the retrieving the content comprises: establishing an HTTP connection between the voice data gateway and the server; and using an HTTP protocol to download an HTML coded page; wherein the formatting the content comprises: parsing content from the HTML coded page; formatting the parsed content for display in the cordless handset, wherein sending the formatted content to the cordless handset comprises wirelessly communicating the parsed content from the voice data gateway to the cordless handset.

6. The system of claim 5, further comprising, wherein the WLAN comprises a network of terminal devices wirelessly coupled to the voice data gateway, and wherein the voice data gateway is configured to operate at a data rate less than 1 Mbps when no standard 802.11 data devices are on the WLAN and wherein the voice data gateway is configured to switch to a data rate at least 1 Mbps when the WLAN is being used by data only terminal devices.

7. The method of claim 5, wherein the voice data gateway is configured to default to a PSTN connection unless otherwise configured by a user.

8. The method of claim 5, wherein the voice data gateway is configured to strip off encapsulated text headers of the content and send only the text headers to the cordless handset.

9. A method, comprising:
utilizing a wired data terminal connected using a local hardware connection to a voice data gateway to provide one or more enhanced telephony functions to a cordless handset via the voice data gateway, wherein the cordless handset communicates with the wired data terminal over a WLAN that includes the voice data gateway, wherein at least a portion of the one or more enhanced telephony functions is performed at the wired data terminal, wherein providing the one or more enhanced telephony functions comprises providing one or more of a voice recognition function and a voice synthesis function, each of the voice recognition and voice synthesis functions configured for:
forwarding commands from the voice data gateway over the local hardwire connection to the wired data terminal, and
receiving, at the voice data gateway, a processed voice command for execution, the processed voice command based upon processing of a digitized voice command at the wired data terminal and transmitted over the local hardwire connection,
wherein the method comprises using data rates between 250 kbps and 750 kbps while voice is being transmitted, and switching to a standard 802.11b compliant data rate when transmitting only data, and
wherein the voice data gateway supports both circuit switched telephony through the PSTN and broadband based telephony including the broadband-to-PSTN gateway translation function.

10. The method of claim 9, wherein the providing the voice synthesis function comprises:
receiving over a wireless link a voice command from the cordless handset at the voice data gateway;
sending the voice command over the local hardwire connection from the voice data gateway to the wired data terminal;
synthesizing the voice command at the wired data terminal;
encoding the voice command at the wired data terminal using an appropriate voice CODEC;
receiving, over the local hardwire link, the encoded voice command at the voice data terminal; and
wirelessly communicating the encoded voice command back to the cordless handset.

11. The method of claim 9, wherein the providing the voice recognition function comprises:
receiving a wirelessly communicated digitized voice command from the cordless handset at the voice data gateway;
sending the digitized voice command over the hardwire connection to the wired data terminal;
receiving, at the voice data gateway, a processed voice command for execution, the processed voice command based upon parsing of a voice command library in the wired data terminal.

* * * * *

UNITED STATES PATENT AND TRADEMARK OFFICE
CERTIFICATE OF CORRECTION

| | |
|---|---|
| PATENT NO. | : 7,782,876 B2 |
| APPLICATION NO. | : 10/401797 |
| DATED | : August 24, 2010 |
| INVENTOR(S) | : Gary Rogalski et al. |

It is certified that error appears in the above-identified patent and that said Letters Patent is hereby corrected as shown below:

Column 10, line 61, insert --and-- after --WLAN;--;

Column 11, line 25, insert --and-- after --capabilities;--;

Column 11, line 32, insert --and-- after --page;--.

Signed and Sealed this

Twenty-sixth Day of October, 2010

David J. Kappos
*Director of the United States Patent and Trademark Office*